United States Patent [19]

Fujimoto

[11] Patent Number: 5,215,202

[45] Date of Patent: Jun. 1, 1993

[54] MOBILE VEHICULAR APPARATUS WITH AERIAL CABIN

[75] Inventor: Mineyuki Fujimoto, Okegawa, Japan

[73] Assignee: Aichi Sharyo Co., Ltd., Nagoya, Japan

[21] Appl. No.: 857,582

[22] Filed: Mar. 25, 1992

Related U.S. Application Data

[62] Division of Ser. No. 577,524, Sep. 5, 1990, Pat. No. 5,183,168.

[51] Int. Cl.⁵ .............................................. B66C 23/04
[52] U.S. Cl. ..................................... 212/232; 212/264
[58] Field of Search ............... 212/165, 168, 174, 179, 212/180, 182, 183, 187-188, 192, 199, 206, 211, 223, 226, 227, 230-233, 237, 244-246, 258, 260-262, 264-265; 414/718, 728-729, 736, 733; 182/2

[56] References Cited

U.S. PATENT DOCUMENTS

| | | | |
|---|---|---|---|
| 2,969,849 | 1/1961 | Grant | 182/2 |
| 3,286,855 | 11/1966 | Bill | 182/2 |
| 3,828,941 | 8/1974 | Coutinho | 182/2 |
| 3,937,340 | 2/1976 | Grove | 182/2 |
| 4,167,072 | 9/1979 | Johansson | 37/117.5 |
| 4,427,121 | 1/1984 | Clements | 212/231 |
| 4,605,132 | 8/1986 | Van Seumeren | 212/185 |
| 4,690,246 | 9/1987 | Horngold et al. | 182/2 |
| 4,744,718 | 5/1988 | Logan et al. | 414/724 |
| 4,944,364 | 7/1990 | Blasko | 182/2 |
| 4,969,789 | 11/1990 | Searle | 414/10 |

FOREIGN PATENT DOCUMENTS

| | | | |
|---|---|---|---|
| 16142 | 11/1956 | Fed. Rep. of Germany | 212/211 |
| 3401278 | 7/1985 | Fed. Rep. of Germany | 182/2 |
| 2591249 | 6/1987 | France | 37/DIG. 3 |
| 60-147923 | 10/1985 | Japan . | |
| 61-81111 | 4/1986 | Japan . | |
| 62-178108 | 8/1987 | Japan . | |
| 62-268312 | 11/1987 | Japan . | |
| 63-144995 | 9/1988 | Japan . | |
| 63-173193 | 11/1988 | Japan . | |
| 64-38273 | 3/1989 | Japan . | |
| 64-38274 | 3/1989 | Japan . | |
| 1-134912 | 9/1989 | Japan . | |
| 1-231800 | 9/1989 | Japan . | |
| 2-28895 | 2/1990 | Japan . | |
| 2-63992 | 5/1990 | Japan . | |
| 2-91789 | 7/1990 | Japan . | |
| 2-103089 | 8/1990 | Japan . | |
| 2-104988 | 8/1990 | Japan . | |
| 2-114308 | 9/1990 | Japan . | |
| 2-129108 | 10/1990 | Japan . | |
| 2-262813 | 10/1990 | Japan . | |
| 688323 | 3/1953 | United Kingdom | 212/165 |
| 2160170 | 12/1985 | United Kingdom | 212/231 |

Primary Examiner—Jesus D. Sotelo
Attorney, Agent, or Firm—Sandler, Greenblum & Bernstein

[57] ABSTRACT

A mobile vehicular apparatus for moving an operator around a three-dimensional aerial work location such as an electric cable or wire supported on posts includes a mobile vehicle having a vehicle body, a boom upwardly extensibly and downwardly collapsibly mounted on the vehicle body, an operator's cabin mounted on a distal end of the boom, cabin having a vertical recess defined in a rear side thereof, at least one manipulator operatively connected to a front side of the cabin, and a lifter operatively connected to the rear side of the cabin. The lifter is collapsibly storable in the recess and extensible from the recess with a distal end portion of the lifter being positioned in overhanging relation to the cabin, the lifter supporting a winding device on the distal end portion.

9 Claims, 6 Drawing Sheets

MOBILE VEHICULAR APPARATUS WITH AERIAL CABIN

This application is a division of application Ser. No. 07/577,524, filed Sep. 5, 1990, now U.S. Pat. No. 5,183,168.

BACKGROUND OF THE INVENTION

The present invention relates to a mobile vehicular apparatus with an aerial platform or cabin mounted on the distal end of a telescope boom which is upwardly extensibly and downwardly collapsibly mounted on a mobile vehicular body. More particularly, the present invention relates to a mobile vehicular apparatus with an aerial cabin which has manipulators mounted on a front side thereof and a lifter extending from a rear side of the cabin in overhanging relation to the upper front side of the cabin and the manipulators.

Some mobile vehicles with aerial platforms are used to handle electric cables supported on poles. While electric cables are being processed, it is often required that the electric cables be left "hot", an electric current flow through the electric cables, in order to prevent an undesirable power failure.

There has been proposed a mobile vehicle with an aerial platform or cabin which is mounted on the distal end of a boom, with manipulators being connected to the platform or cabin and extending forwardly therefrom. The proposed vehicle with such an aerial platform or cabin is indispensable to keep the operator safe and make the operation efficient while handling electric cables that are alive, carrying high-voltage electric currents.

Various mobile vehicles with aerial platforms or cabins are known which include a lifting device for lifting the platform or cabin to a desired vertical position so that operations using the manipulators can be effected more efficiently. The conventional lifting device is mainly designed to lift and lower objects such as transformers, crossarms, etc., which are to be attached and detached by the manipulators. The lifting device can therefore lift and lower these objects more efficiently than mobile vehicles with aerial platforms or cabins which are not equipped with such lifting devices. However, the prior lifting device does not have an additional support function such as for temporarily supporting an electric cable to prevent the electric cable from swinging so that the electric cable can be cut off or spliced with two manipulators highly efficiently. To cut off or splice an electric cable, it has been customary to support the electric cable with one of the manipulators and cut off or splice the electric cable with the other manipulator. Accordingly, such a process has not been efficient enough with the conventional aerial platform or cabin arrangement.

The lifting device of the conventional structure is always positioned in a spread condition near the platform or cabin irrespective of whether the lifting device is in use or not. When not in use, the lifting device may be in the way of the manipulators or the platform or cabin, when the manipulators or the platform or cabin is moved around. In the case where the lifting device is located upwardly of the platform or cabin, when the boom is collapsed and the vehicle runs, since the lifting device remains high over the platform or cabin, the center of gravity of the mobile vehicle is high and hence the mobile vehicle does not run stably.

SUMMARY OF THE INVENTION

It is an object of the present invention to provide a mobile vehicular apparatus with an aerial cabin, which includes manipulators disposed in front of the cabin and a lifter extending from a rear side of the cabin in overhanging relation to the cabin and the manipulators.

Another object of the present invention is to provide a mobile vehicular apparatus with an aerial cabin, which includes a lifting device that can not only lift and lower an object to be installed at and detached from a high position, but also grip an object to be worked on by manipulators connected to the cabin.

Still another object of the present invention is to provide a mobile vehicle apparatus with an aerial cabin, which includes a lifter that can be stored compactly behind the cabin.

According to the present invention, there is provided an apparatus for moving an operator around a three-dimensional aerial work location, comprising a mobile vehicle having a vehicle body, a boom upwardly extensibly and downwardly collapsibly mounted on the vehicle body, an operator's cabin mounted on a distal end of the boom, the cabin having a vertical recess defined in a rear side thereof, at least one manipulator operatively connected to a front side of the cabin, and a lifter operatively connected to the rear side of the cabin, the lifter being collapsibly storable in the recess and extensible from the recess with a distal end portion of the lifter being positioned in overhanging relation to the cabin, the lifter supporting a winding device on the distal end portion.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
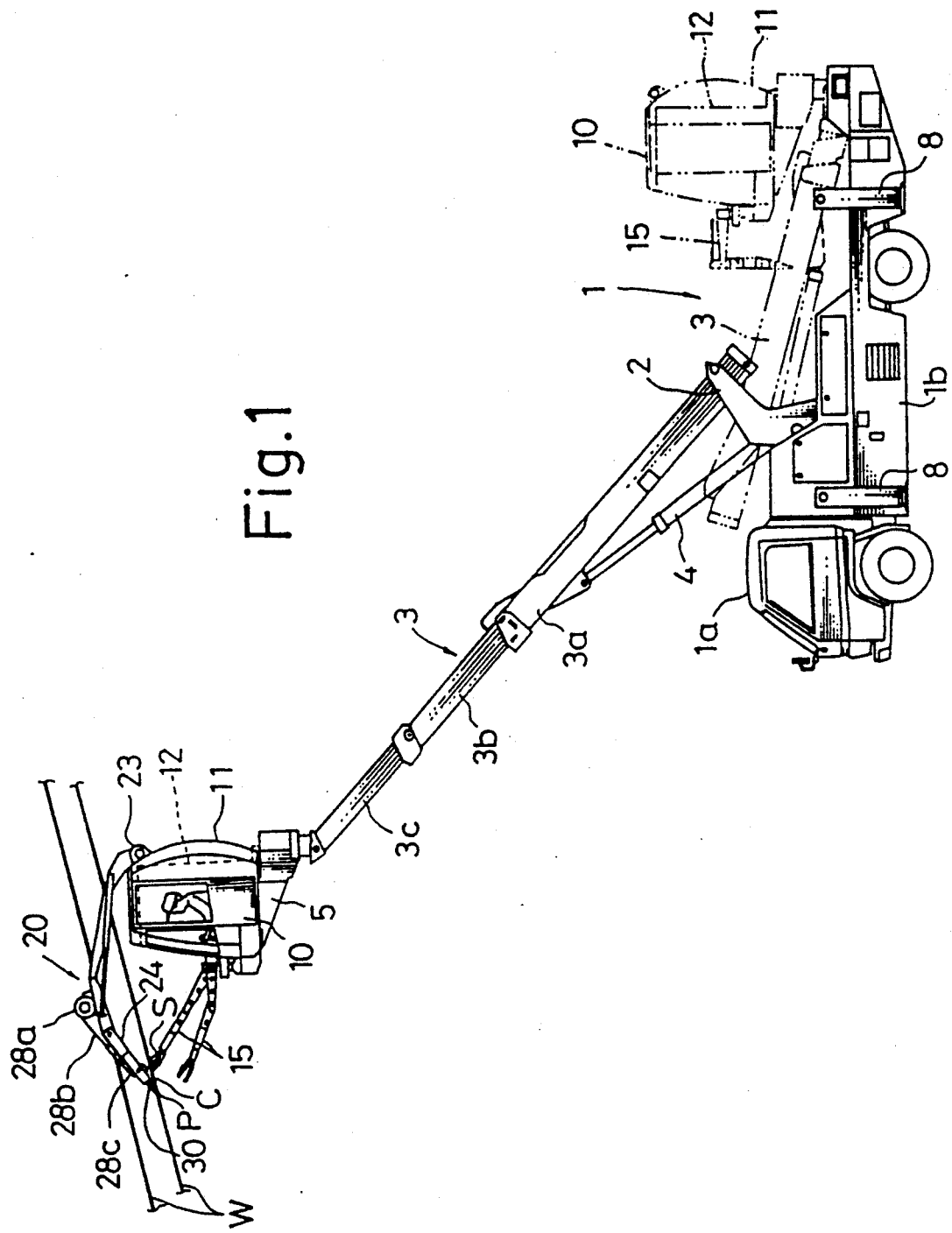
FIG. 1 is a side elevational view of a mobile vehicular apparatus with an aerial cabin according to the present invention.

As shown in FIG. 1, a mobile vehicular apparatus according to the present invention is particularly constructed to handle electric cables or wires supported on poles. The mobile vehicular apparatus includes a mobile vehicle 1 having a driver's cabin 1a and a vehicle body 1b. The vehicle body 1b supports a turntable 2 on which there is mounted a telescopic boom 3 which is upwardly extensible and downwardly collapsible by a cylinder 4. The telescopic boom 3 comprises three boom members 3a, 3b, 3c. The boom member 3c at the distal end of the boom 3 supports an operator's cabin 10 through a support 5 which can be vertically and horizontally swung with respect to the boom 3, so that the cabin 10 can be held horizontally at all times irrespective of whether the boom 3 is moved upwardly or downwardly and can also be angularly moved back and forth and laterally through 360° with respect to the boom 3.

The vehicle body 1b has four outriggers 8 at four corners, i.e., front left, front right, rear left, and rear right corners, the outriggers 8 projecting laterally and can be extended downwardly into contact with ground. When in operation, the outriggers 8 are forcibly extended downwardly to support the vehicle body 1b.

Two manipulators 15 are mounted on the front side of the cabin 10. The manipulators 15 can be operated by the operator who sits in the cabin 10. A lifter 20 extends from the rear side of the cabin 10 in overhanging relation to the cabin 10 and the manipulators 15.

Figure 3:
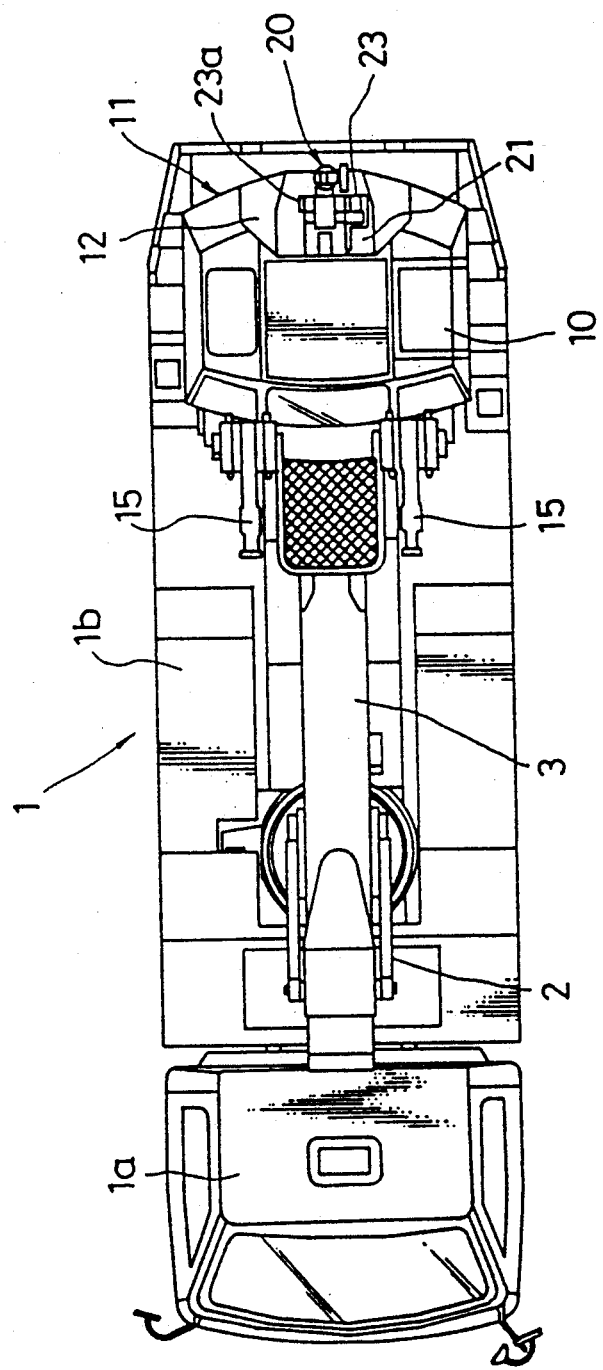
FIG. 3 is a plan view of the mobile vehicular apparatus.
Figure 4:
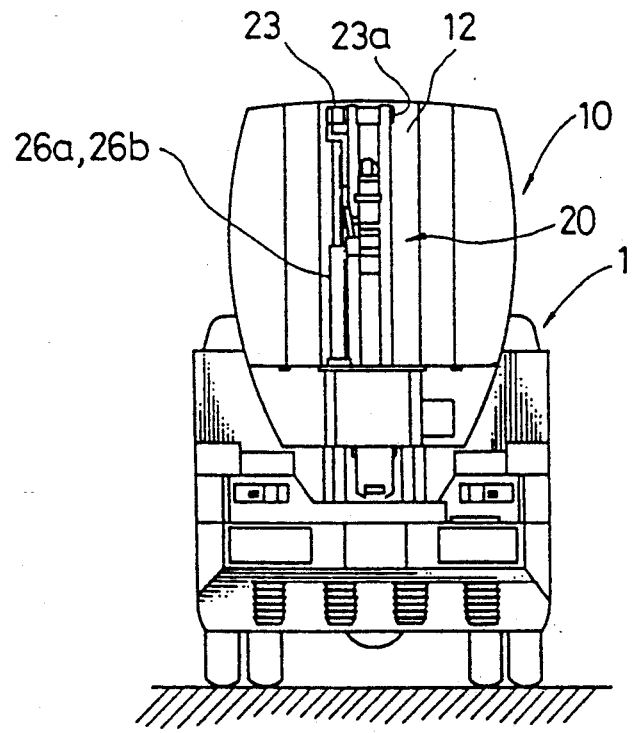
FIG. 4 is a rear elevational view of the mobile vehicular apparatus.

The cabin 10 has a rear wall 11 with a vertically extending recess 12 which is located centrally in the horizontal direction of the rear wall 11. The lifter 20 can be stored in the recess 12 when it is collapsed, as shown in FIGS. 3 and 4.

Figure 2:
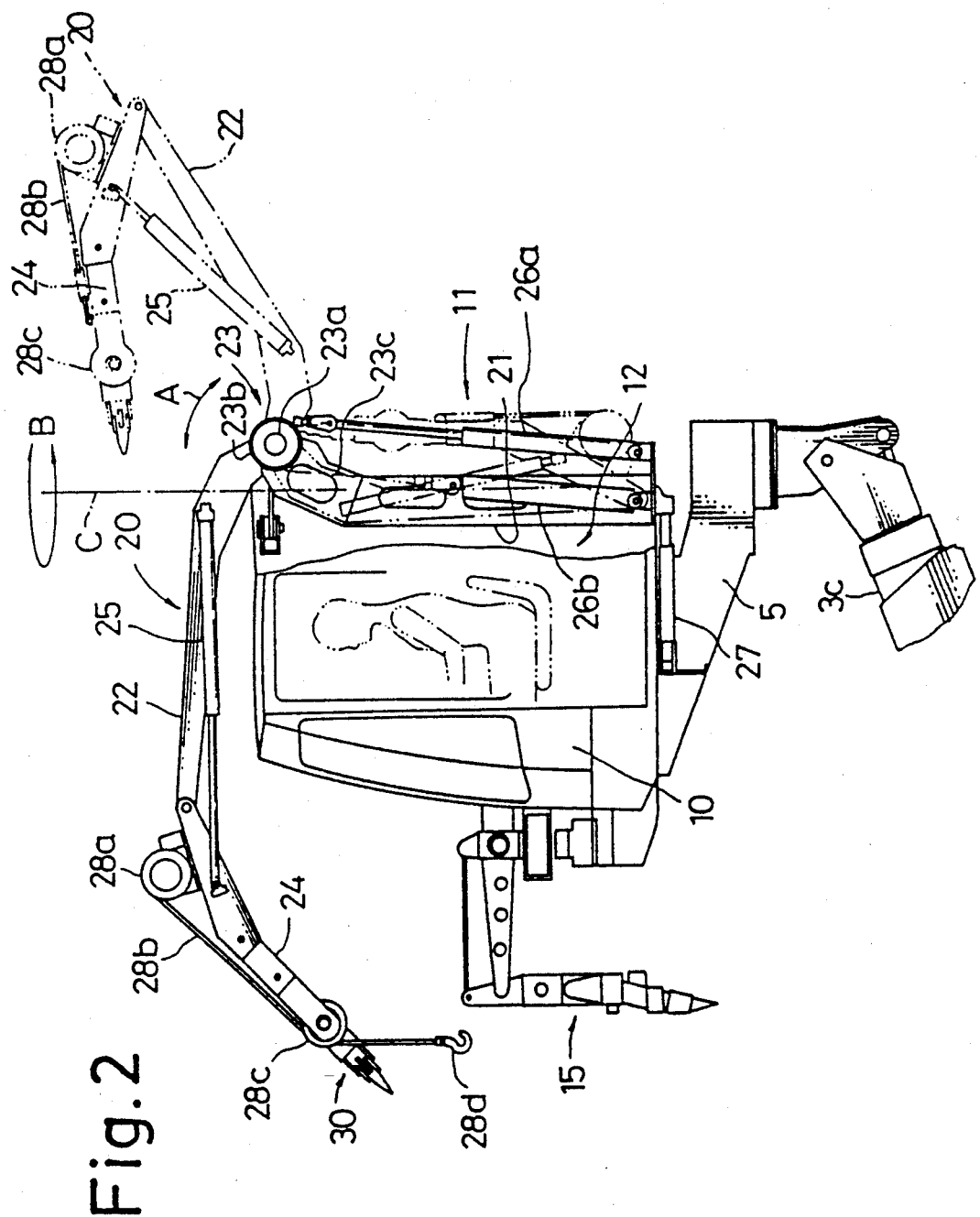
FIG. 2 is an enlarged side elevational view of the aerial cabin with associated manipulators and a lifter.

As shown in FIG. 2, the lifter 20 comprises a frame 21 vertically disposed in the recess 12 and rotatably mounted behind the cabin 10 around a vertical axis, a subboom 22 angularly movably mounted on the upper end of the frame 21, the subboom 22 being positionable in the frame 21 when stored and positionable over the cabin 10 when in operation, a turning unit 23 for turning the subboom 22 with respect to the frame 21, an arm 24 bendably pivoted to the distal end of the subboom 22 and collapsible in underlying relation to the subboom 22 when stored, and a cylinder 25 having opposite ends pivotally connected to the subboom 22 and the arm 24, for folding the arm 24 with respect to the subboom 22.

The turning unit 23 comprises a sprocket 23b by which the subboom 22 is pivotally connected to the frame 21 and which is mounted on one end of the pivot shaft 23a so as to rotate with the subboom 22, a chain 23c trained around the sprocket 23b, and a pair of cylinders 26a, 26b having ends coupled to the opposite ends of the chain 23c and other ends pivotally joined to the frame 21, the cylinders 26a, 26b being operable in complementary relation. When the cylinders 26a, 26b are actuated, the subboom 22 is angularly moved in the directions indicated by the arrows A.

The frame 21 is angularly movable about a vertical axis C with respect to the cabin 10. Specifically, the frame 21 can be turned about the vertical axis C in the directions indicated by the arrows B by a cylinder 27 whose opposite ends are pivotally connected to the lower end of the frame 21 and the cabin 10, respectively.

The lifter 20 serves to lift an object such as a transformer to be installed on a pole. On the arm 24, there are mounted a winch 28a, a rope 28b that can be wound on and unwound from the winch 28a, and a sheave 28c on which the rope 28b is trained. A hook 28d is attached to the tip end of the rope 28b.

Figure 5:
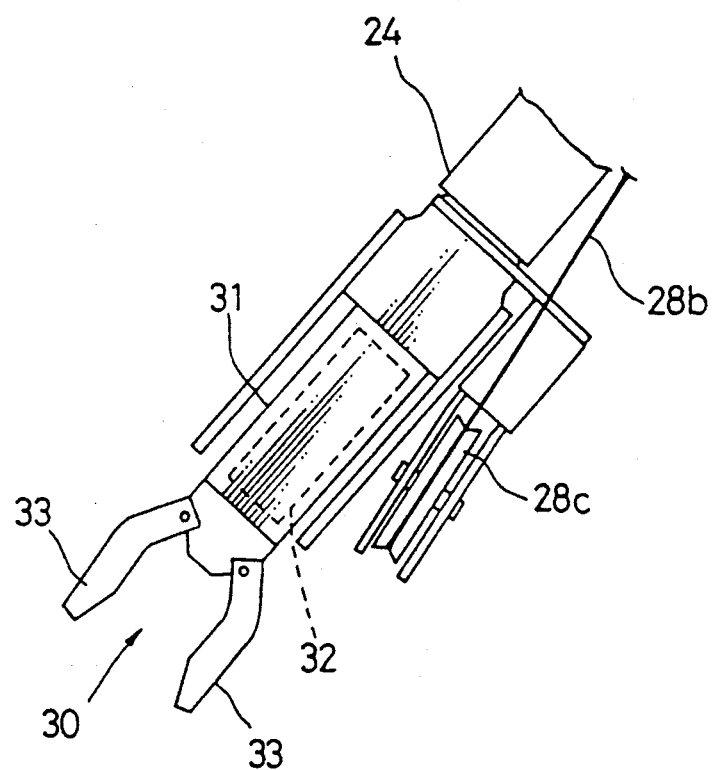
FIG. 5 is an enlarged fragmentary side elevational view showing a distal end portion of the lifter.

The lifter 20 is also capable of gripping an electric wire W. To this end, a gripper 30 is mounted on the tip end of the arm 24. As shown in FIG. 5 at an enlarged scale, the gripper 30 comprises two jaws 33 which can be opened and closed by an actuator 32 housed in a base 31 that is coupled to the arm 24.

Operation of the mobile vehicular apparatus thus constructed will be described below.

As described above, the lifter 20 has its proximal end disposed behind the cabin 10 and its distal end portion extending in overhanging relation to the manipulators 15 in operation, with the gripper 30 mounted on the tip end of the lifter 20. When the manipulators 15 are to be operated by the operator in the cabin 10 to cut off an electric wire W, a suitable portion P of the electric wire W is first gripped by the gripper 30. Thereafter, the manipulators 15 are operated so that the righthand manipulator 15 grips the electric wire W at a position S and the lefthand manipulator 15 cuts off the electric wire at a position C between the positions P, S with a cutter held by the lefthand manipulator 15.

Heretofore, it has been customary practice to grip the electric wire W with the righthand manipulator 15 and cut off the electric wire W with the lefthand manipulator 15. One end of the electric wire W gripped by the righthand manipulator 15 does not fall after it is cut off since the end is held by the righthand manipulator 15. However, the other end of the electric wire W as it is cut off falls off because it is not held by the manipulators 15. Accordingly, it has been necessary and laborious to treat the electric wire W which has fallen. With the arrangement of the present invention, however, one end of the electric wire W is gripped by one of the manipulators 15 and the other end of the electric wire W is gripped by the gripper 30, while the electric wire W is being cut off by the other manipulator 15. Consequently, the both ends of the electric wire W as it is cut off do not fall, and the cut electric wire W can easily be handled.

When ends of an electric wire W are to be spliced, since one end of the electric wire can be gripped by the gripper 30, the electric wire ends can easily be spliced together as either one of the electric wire ends is prevented from swinging.

Figure 6:
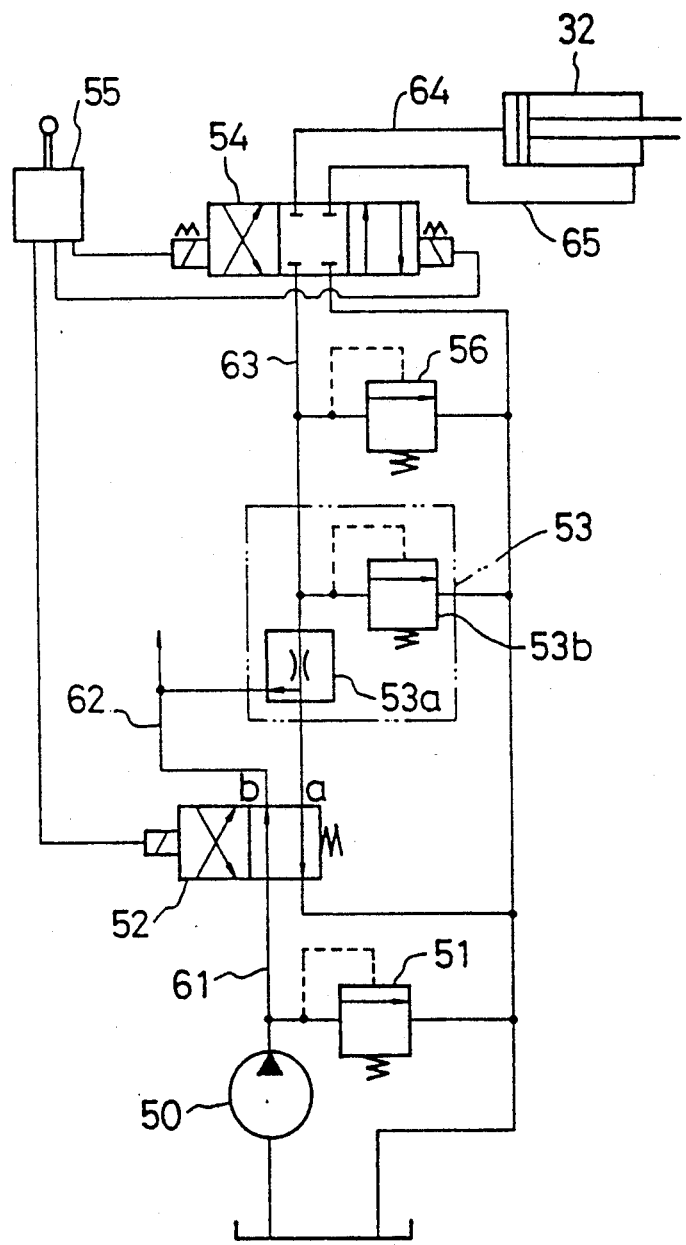
FIG. 6 is a circuit diagram of a hydraulic control circuit for a gripper actuator in the lifter.

The gripper 30 can be opened and closed by the actuator 32 which comprises a hydraulic cylinder. A hydraulic pressure circuit for controlling the operation of the actuator 32 is shown in FIG. 6. Now, the hydraulic pressure circuit shown in FIG. 6 will be described below.

As shown in FIG. 6, a hydraulic pump 50, which is actuated by the engine (not shown) of the mobile vehicle 1, has an outlet oil passage 61 connected to a first pressure regulating valve 51 which keeps the hydraulic pressure in the outlet oil passage 61 at a predetermined level. The outlet oil passage 61 is also connected to a solenoid-operated directional control valve 52 to which two oil passages 62, 63 are connected. The oil passage 62 is connected to a control valve (not shown) for controlling another actuator, and the oil passage 63 is connected to a solenoid-operated directional control valve 54. Normally, the solenoid-operated directional control valve 52 connects the oil passage 62 to the outlet oil passage 61 of the hydraulic pump 50. When the solenoid of the valve 52 is energized, the valve 52 is shifted over to connect the oil passage 63 to the outlet oil passage 61. The solenoid-operated directional control valves 52, 54 are connected to each other through the oil passage 63, which has a priority valve 53 that always supplies oil under pressure at a constant rate to the solenoid-operated directional control valve 54.

The solenoid-operated directional control valve 54 is connected to extension and contraction oil chambers in the actuator (hydraulic cylinder) 32 which opens and closes the gripper 30, through oil passages 64, 65. The solenoids of the valve 52, 54 are electrically connected to a control unit 55 which controls the opening and closing of the gripper 30. When the control unit 55 is operated on, the solenoid-operated directional control valves 54, 52 are shifted over to supply oil under pressure from the hydraulic pump 50 to the hydraulic actuator 32.

The priority valve 53 comprises an orifice 53a and a second pressure regulating valve 53b. When oil under pressure from the hydraulic pump 50 is supplied to the oil passage 63 through a port "a" of the solenoid-operated directional control valve 52, the priority valve 53 always supplies, with priority, the oil from the oil passage 63 to the solenoid-operated directional control valve 54.

The gripper 30 is controlled in operation when the operator in the cabin 10 operates on the control unit 55 that is mounted in the cabin 10. To actuate the gripper 30, the control unit 55 is operated on to apply an operation signal to energize the solenoid of the solenoid-operated directional control valve 52, thereby connecting the outlet oil passage 61 through the port "a" to the priority valve 53 in the oil passage 63. Therefore, oil under pressure from the hydraulic pump 50 is supplied through the priority valve 53 at a constant rate to the solenoid-operated directional control valve 54. The hydraulic pressure in the oil passage 63 at this time is regulated by the second pressure regulating valve 53b.

The control unit 55 is also operated on to apply an operation signal to selectively energize the two solenoids of the solenoid-operated directional control valve 54, which is then shifted to the left or the right. The oil under pressure supplied from the priority valve 53 through the oil passage 63 is supplied through the valve 54 to the hydraulic actuator 32, thus extending or contracting the hydraulic actuator 32. Now, the two jaws 32 of the gripper 30 are opened or closed by the hydraulic actuator 32.

Therefore, the electric wire W or the like can be gripped by the jaws 32 of the gripper 30. Insofar as the control unit 55 is continuously operated on to keep the solenoid-operated directional control valve 54 shifted to the left or the right, the solenoid-operated directional control valve 52 is also kept in the shifted position "a". Therefore, the outlet oil passage 61 of the hydraulic pump 50 and the oil passage 63 remain connected to each other, and the oil under pressure from the hydraulic pump 50 is continuously supplied at a constant rate through the priority valve 53 to the hydraulic actuator 32. Therefore, the gripper 30 maintains its gripping forces on the electric wire W. When the gripper 30 is not used the control unit 55 is not operated on. Accordingly, the solenoid-operated directional control valves 54, 52 are held in the illustrated position, and the outlet oil passage 61 and the oil passage 62 are connected to each other, so that oil under pressure from the hydraulic pump 50 is supplied to the control valve which controls the other actuator.

In the above embodiment, as long as the control unit 55 is continuously operated on, the solenoid-operated directional control valve 54, 52 are kept in the shifted position, and the oil under pressure from the hydraulic pump 50 is continuously supplied at a constant rate through the priority valve 53 to the hydraulic actuator 32. However, the control unit 55 may be operated on to enable the solenoid-operated directional control valves 54, 52 to remain shifted by themselves.

The lifter 20 is extended and collapsed as follows;

When the lifter 20 is to be used, the cylinder 26a of the turning unit 23 is extended and the cylinder 26b thereof is contracted to displace the chain 23c to the lefthand side, thereby rotating the sprocket 23b counter-clockwise (FIG. 2) on which the chain 23c is trained. The subboom 22 is now turned from the imaginary position to the solid-line position in overhanging relation to the cabin 10 and the manipulators 15. At the same time, the cylinder 25 operatively coupled between the subboom 22 and the arm 24 extended to extend the arm 24 from the collapsed position below the subboom 22 until the tip end of the arm 24 is positioned ahead of the manipulators 15. The lifter 20 is now ready for operation.

When the lifter 20 is to be stored in the recess 12, the cylinder 26a is contracted and the cylinder 26b is extended thereby to displace the chain 23c to the right, so that the sprocket 23b with the chain 23c trained therearound is rotated clockwise (FIG. 2). The subboom 22 is now turned to the right into a position behind the cabin 10. Simultaneously, the cylinder 25 acting between the subboom 22 and the arm 24 is contracted to collapse the arm 24 toward the subboom 22. The lifter 20 is now placed in the recess 12.

While the mobile vehicular apparatus according to the present invention has been described as being used to handle electric cables or wires supported on posts, it may be used in other applications involving higher work locations and requiring the lifter and manipulators to move in three dimensions.

Although a certain preferred embodiment has been shown and described, it should be understood that many changes and modifications may be made therein without departing from the scope of the appended claims.

What is claimed is:

1. An apparatus for moving an operator around a three-dimensional aerial work location, comprising:
   a mobile vehicle having a vehicle body, said vehicle body having at least front and rear sides;
   a boom upwardly extensibly and downwardly collapsibly mounted on said vehicle body, said boom being mounted at one end and having a distal end which is opposite said one end;
   an operator's cabin mounted on said distal end of said boom, said cabin having a vertical recess defined in a rear side thereof;
   at least one manipulator operatively connected to a front side of said cabin, and
   a lifter operatively connected to the rear side of said cabin, said lifter being collapsibly storable in said recess and extensible from said recess with a distal end portion of said lifter being positioned in overhanging relation to said cabin, said lifter supporting at least one gripping device on said distal end portion.

2. An apparatus according to claim 1, further comprising a winding device on said distal end portion, for lifting and lowering an object.

3. An apparatus according to claim 1, wherein said gripping device comprises two openable and closable jaws and a hydraulic actuator for opening and closing said jaws.

4. An apparatus according to claim 3, further including a hydraulic pressure circuit for supplying working oil to said hydraulic actuator, said hydraulic pressure circuit having a priority valve for supplying, with priority, working oil to said hydraulic actuator at a constant rate at all times while said hydraulic actuator is in operation.

5. An apparatus according to claim 4, wherein said hydraulic pressure circuit comprises:

a hydraulic pump;

a control unit disposed in said cabin;

a first solenoid-operated directional control valve actuatable in response to operation of said control unit, for changing directions in which to supply the working oil;

an oil passage connecting said hydraulic pump and said first solenoid-operated directional control valve;

a second solenoid-operated directional control valve disposed in said oil passage and shiftable in response to shifting of said first solenoid-operated directional control valve, for supplying the working oil from said hydraulic pump to said first solenoid-operated directional control valve; and a priority valve disposed in the oil passage connecting said first and second solenoid-operated directional control valves, for supplying the oil under pressure at a constant rate at all times to said first solenoid-operated directional control valve, whereby the oil under pressure can be supplied at a constant rate to said hydraulic actuator at all times while said hydraulic actuator is in operation.

6. An apparatus for moving an operator around a three-dimensional aerial work location, comprising:

a mobile vehicle having a vehicle body, said body having at least front and rear sides;

a boom mounted at one end, on said vehicle, and having a distal end which is upwardly extensible from and downwardly collapsible toward said vehicle body;

an operator's cabin mounted on a distal end of said boom, said cabin having a vertical recess defined in a rear side thereof;

at least one manipulator operatively connected to a front side of said cabin; and a lifter having a distal end portion extending in overhanging relation to said cabin and said manipulator, said distal end portion supporting a winding device for lifting and lowering an object and a gripping device for gripping an object.

7. An apparatus according to claim 6, wherein said gripping device comprises two openable and closable jaws and a hydraulic actuator for opening and closing jaws.

8. An apparatus according to claim 7, further including a hydraulic pressure circuit for supplying working oil to said hydraulic actuator, said hydraulic pressure circuit having a priority valve for supplying, with priority, working oil to said hydraulic actuator at a constant rate at all times while said hydraulic actuator is in operation.

9. An apparatus according to claim 8, wherein said hydraulic pressure circuit comprises:

a hydraulic pump;

a control unit disposed in said cabin;

a first solenoid-operated directional control valve actuatable in response to operation of said control unit, for changing directions in which to supply working oil;

an oil passage connecting said hydraulic pump and said first solenoid-operated directional control valve;

a second solenoid-operated directional control valve disposed in said oil passage and shiftable in response to shifting of said first solenoid-operated directional control valve, for supplying working oil from said hydraulic pump to said first solenoid-operated directional control valve; and a priority valve disposed in said oil passage connecting said first and second solenoid-operated directional control valves, for supplying working oil under pressure at a constant rate at all times to said first solenoid-operated directional control valve, whereby said working oil under pressure can be supplied at a constant rate to said hydraulic actuator at all times while said hydraulic actuator is in operation.

* * * * *

UNITED STATES PATENT AND TRADEMARK OFFICE
CERTIFICATE OF CORRECTION

PATENT NO. : 5,215,202
DATED : June 1, 1993
INVENTOR(S) : M. FUJIMOTO

It is certified that error appears in the above-indentified patent and that said Letters Patent is hereby corrected as shown below:

Title page, section [57], in the abstract, line 7, change "boom. cabin" to ---boom. the cabin---.
At column 1, line 12, change "telescope" to ---telescopic---.
At column 1, line 23, insert ---i.e.,--- before "an electric".
At column 6, line 7, insert ---is--- before "extended".
At column 8, line 5 (claim 7, line 3), insert ---said--- after "closing".

Signed and Sealed this

Twenty-third Day of August, 1994

Attest:

BRUCE LEHMAN

*Attesting Officer*     *Commissioner of Patents and Trademarks*